United States Patent [19]

Draper et al.

[11] Patent Number: 5,621,325
[45] Date of Patent: Apr. 15, 1997

[54] AVOIDING GHOSTING ARTIFACTS DURING SURFACE LOCATION OF SUBSURFACE TRANSMITTERS

[75] Inventors: Gregory W. Draper; Frank S. Nickel; Michael F. Gard; Jian J. Jin, all of Perry, Okla.

[73] Assignee: The Charles Machine Works, Inc., Perry, Okla.

[21] Appl. No.: 442,487

[22] Filed: May 16, 1995

[51] Int. Cl.⁶ ............................. G01V 3/11; G01R 19/145
[52] U.S. Cl. .............................................. 324/326; 324/67
[58] Field of Search ......................... 324/66, 67, 326–329, 324/345

[56] References Cited

U.S. PATENT DOCUMENTS

| | | | |
|---|---|---|---|
| 4,427,943 | 1/1984 | Cloutier et al. | 324/326 |
| 4,665,369 | 5/1987 | Faller et al. | 324/326 |
| 4,686,454 | 8/1987 | Pecukonis | 324/326 |
| 4,951,055 | 8/1990 | Katayama | 324/326 |
| 5,093,622 | 3/1992 | Balkman | 324/326 |
| 5,194,812 | 3/1993 | Yokoi | 324/326 |
| 5,361,029 | 11/1994 | Rider et al. | 324/326 |

FOREIGN PATENT DOCUMENTS

| | | | |
|---|---|---|---|
| 6-214043 | 8/1994 | Japan | 324/326 |

*Primary Examiner*—Sandra L. O'Shea
*Assistant Examiner*—Roger C. Phillips
*Attorney, Agent, or Firm*—Sidley & Austin

[57] ABSTRACT

An apparatus and method is provided for determining if the signal received from an underground beacon (10) at a locator (22) is a true signal or a ghost signal. Orthogonal horizontal antenna (38) and vertical antenna (40) are used and a ratio is computed of the signal strengths measured by the two antennas. At the true location, the signal strength in the horizontal antenna (38) will be maximum and the signal strength of the vertical antenna (40) will be a null. If the ratio of the signal strength sensed by the horizontal antenna and vertical antenna is large, exceeding a predetermined value, the locator is receiving a valid signal from the beacon and a display of this fact is made on a display on the locator and the depth of the beacon is calculated. If the ratio is less than the predetermined value, a ghost signal is being received and this fact is displayed on the display on the locator (22).

17 Claims, 2 Drawing Sheets

AVOIDING GHOSTING ARTIFACTS DURING SURFACE LOCATION OF SUBSURFACE TRANSMITTERS

TECHNICAL FIELD OF THE INVENTION

This invention relates to underground boring, and specifically to location of the boring head by a beacon.

BACKGROUND OF THE INVENTION

Subsurface boring is increasingly important because it allows rapid placement of gas and water lines, sewers, electrical service, cable television service, and similar utility connections with minimal disturbance of roads, landscaping, buildings, and other surface features. Subsurface boring allows placement of pipe and utility connections where conventional surface installation by trenching is impractical or impossible as, for example, when utility connections must cross rivers, canals, major highways, or rail lines. Significant practical and economic advantages are derived from the ability to provide pipe and utility connections with minimal surface disturbance or to provide subsurface crossing of surface barriers.

However, realization of these advantages is dependent on the ability to properly locate and control the boring tool bit during operation. Accurate location of the boring tool is an especially important problem. In many boring tool systems, a small transmitting device called a beacon is installed immediately behind the drill bit. The electromagnetic field generated by the subsurface beacon is detected at the surface using devices variously called trackers or locators. The beacon's electromagnetic field is often modulated to convey subsurface information from the beacon to the system operator. Beacon signal amplitude, measured by one or a plurality of surface antennas, can be used to calculate distance between the underground beacon and the tracker.

Those familiar with the art recognize that the interaction of the antenna and the beacon's electromagnetic field can produce false, or "ghost", locations as indicated by the tracker. Locating on a ghost signal can be inconvenient and even dangerous as it presents a false picture of the beacon's location to the boring machine operator.

SUMMARY OF THE INVENTION

In accordance with one aspect of the present invention, a method is provided for locating the position of an underground beacon with the beacon transmitting an electromagnetic signal. The method includes the step of orienting a first antenna substantially horizontally to the ground surface and orienting a second antenna substantially vertical to the ground surface. The method further includes the step of calculating the ratio of the signal strength of the signal received from the beacon by the first antenna, to the signal strength of the signal received from the beacon by the second antenna.

The method further includes the step of indicating the reading of the valid location signal of the beacon if the ratio exceeds a predetermined value, as indicated by a maximum signal strength in the first antenna and a null in the second antenna. The method further includes the step of indicating a ghost signal if the calculated ratio is below a certain predetermined value, indicating that a ghost signal is being received by the first and second antennas.

BRIEF DESCRIPTION OF THE DRAWINGS

For a more complete understanding of the present invention and for further advantages thereof, reference is now made to the following description of the preferred embodiment taken in conjunction with the accompanying drawings, in which.

DETAILED DESCRIPTION

Figure 1:
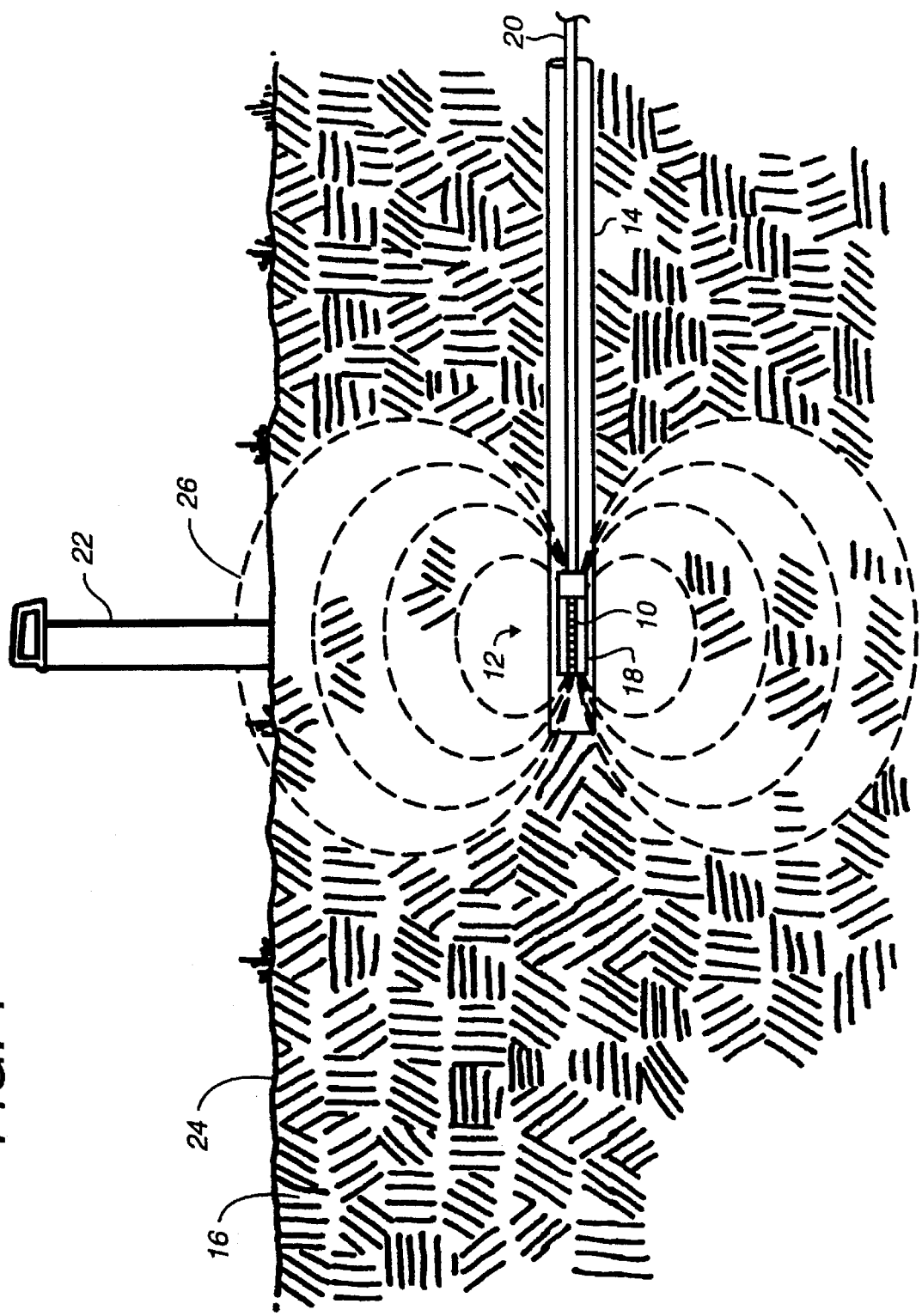
FIG. 1 is an illustrative view of an underground beacon and a surface locator incorporating the present invention.

The present invention includes a method and apparatus for detecting the location of a beacon 10 in an underground boring device 12 which is forming a borehole 14 within the earth 16. The beacon 10 is generally located immediately behind the boring bit 18. A drill string 20 generally extends from the boring bit back to a surface location where equipment is located to rotate the drill string and move the drill string and boring device 12 forward in the borehole 14.

A handheld locator or tracker 22 is used by service personnel to find the location of the beacon under the ground surface 24. It is highly desirable to maintain constant information regarding the location of the beacon, and therefore the boring bit 18, to insure that the borehole is formed in the proper direction and at the desired depth.

Conventional tracker devices commonly measure the magnetic field 26 generated by the beacon 10 using horizontally oriented antennas. As illustrated by solid line 28 in the graph of FIG. 2, a horizontal antenna traversing through the electromagnetic field of a subsurface magnetic signal source, such as beacon 10, produces a multi-lobed electrical response, including "ghost" lobes 30 and 32 and a major lobe or valid lobe 34. The true or valid lobe 34 exists when the tracker device is directly over the beacon signal source. The ghost or smaller lobes are false indications of the true beacon position. Unless precautions are taken, the detecting of the ghost lobes 30 and 32 could provide false indications of the underground location of the beacon 10. The aim of the invention is to reduce the effects of detecting the ghost signals 30 and 32.

Figure 2:
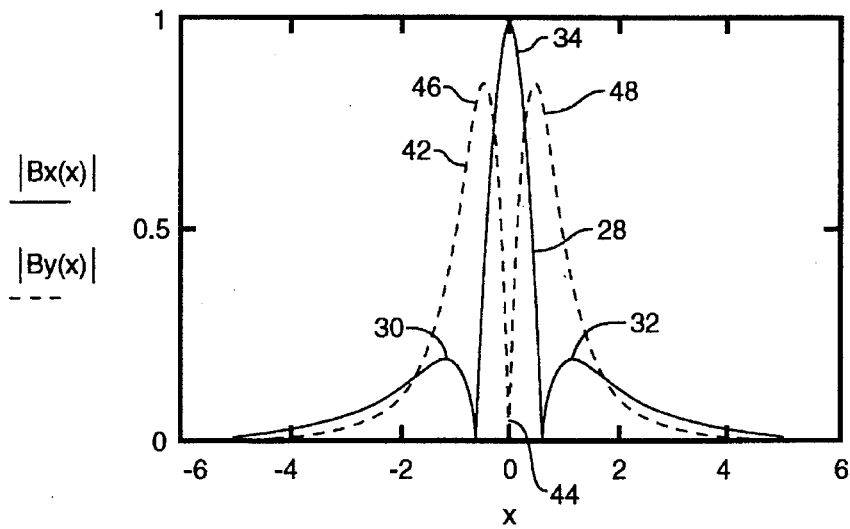
FIG. 2 is a graphical illustration of the ghost and valid signal strengths sensed by horizontal and vertical antennas of the locator equipment.
Figure 3:
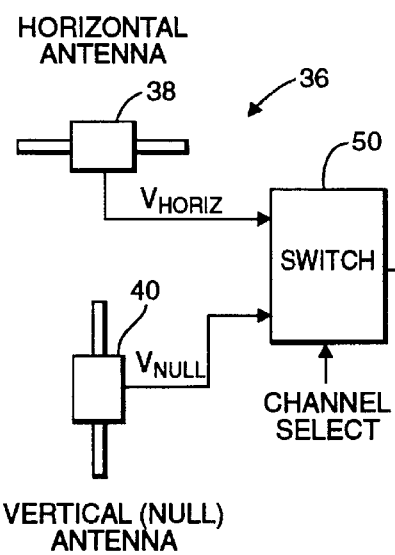
FIG. 3 is a schematic of a receiver circuit of the tracker device forming a portion of the present invention.

The antenna assembly 36 of the present invention, as seen in FIG. 3, includes a horizontally oriented antenna 38 and a vertically oriented antenna or null antenna 40. The antenna assembly 36 is part of locator 22. As illustrated in broken line 42 of FIG. 2, the response of the vertical antenna 40 has a true null 44 when disposed directly above the beacon, and has peaks 46 and 48 at a distance from the true null. The vertical axis of the graph of FIG. 2 shows the normalized signal strengths of the signals received by the horizontal and vertical oriented antennas, whereas the horizontal axis of the graph is the lateral distance on each side of a vertical reference line that passes through the transmitting beacon In some prior art locators, the signals produced by an orthogonal antenna array are added in quadrature (the square root of the sum of the squares) to obtain a composite response representative of the magnetic field vector at the antenna location. The quadrature response also transforms horizontal and null (vertical) antenna responses into a single-lobed signal which avoids the possibility of locating on a ghost signal. However, the use of a quadrature sum is not always an optimal solution to the problem of avoiding locations on ghost signals.

The present invention recognizes that the quadrature sum is not essential to identifying and avoiding ghost locations. It is sufficient to recognize that the null antenna response is substantially zero when the tracker device is directly over the subsurface signal source, whereas the horizontal signal component is at its maximum. With regard to the ghost signals, the null antenna response is generally greater than or equal to the horizontal antenna response. Thus, a simple comparison algorithm can be used to determine whether or not a location has been made on a laterally spaced ghost signal or directly over the subsurface signal source. In many cases, the resulting simplification can be implemented in electronic hardware. Alternatively, a computer can use an elementary software algorithm for the necessary calculation. The preferred embodiment relies on a software algorithm.

As illustrated in the electrical circuit block diagram of FIG. 3, a channel select switch 50 alternately selects the signals received from the horizontal antenna 38 and the vertical antenna 40 and couples the same to an analog-to-digital (A/D) converter 52. The channel select switch is driven by a select signal to alternatively provide signal samples to the A/D converter 52. As can be seen, there is no amplification in the channel select switch, and thus the amplitudes of the signals received from the antennas 38 and 40 undergo the same processing channel to the A/D converter 52. Since the same A/D converter processes both sets of signals, any change in the effective quantization of such converter (e.g., thermal drift of a voltage reference) is reflected in the amplitudes of both sets of signals, and thus accuracy of the signal ratio is maintained. In A/D converter 52, digital numbers representing the signal strength or amplitude measured by the horizontal antenna and the vertical antenna are calculated. A computation element 54 calculates the ratio of the signal strengths measured, comprising the ratio of the voltage $V_{HORIZ}$ induced in the horizontal antenna divided by voltage $V_{NULL}$ induced in the vertical antenna, where V is the induced voltage in each of the antennas. A visual display 61 may be coupled to the computational element 54 to provide the operator of the tracker device a visual indication of the depth of the underground beacon 10.

Figure 4:
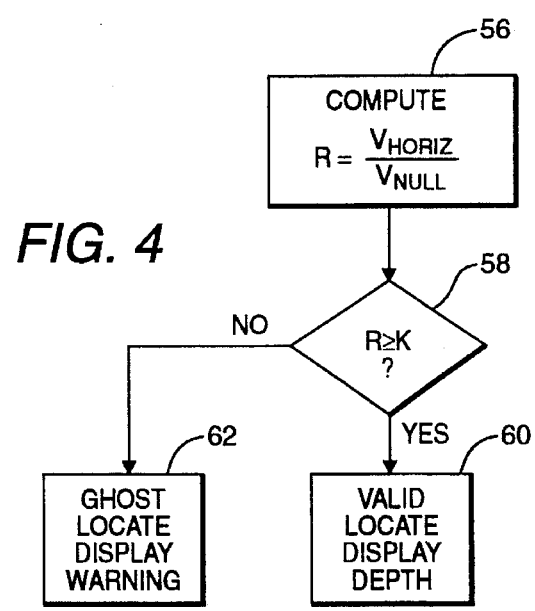
FIG. 4 is a flow chart of the logic decision made as part of the present invention.

With reference to FIG. 4, the logic steps undertaken in the computation element 54 are illustrated. First, step 56 computes the ratio and defines it as a factor R. Again, the ratio is the amplitude between the signal received by the horizontally oriented antenna 38 and that of the vertically oriented antenna 40. Step 58 determines if the R factor is greater than or equal to a predetermined value K, for example 4. If the value is above K, step 60 indicates that the signal received by the locator 22 is valid and can be used to calculate the depth of the beacon by conventionally known techniques and display the depth on display 61 forming part of the locator 22. If the calculated ratio R is less than K, step 62 indicates that a ghost signal is being received and displays a warning to the operator by a visual indication on the display 61 of the locator 22 to inform the operator that a ghost signal is being monitored and that the operator should move to another location until a valid signal is located. The classification of a signal as a ghost signal may, for example, cause the depth to be displayed with an obvious visual flag (parentheses, brackets, virgules, or the like), the display device may present a particular ghosting symbol, or the display device may refuse to display an erroneous depth.

The preferred embodiment will show the calculated depth, and if the beacon has not been located properly will simultaneously point to a ghosting symbol.

The relationship between the value K and the ratio R is arbitrary and may be selected for convenience. What is important is that the value K be selected to assure that when a sufficient difference exists between the null of the vertical antenna and the peak of the horizontal antenna, the locator 22 is located above the underground beacon 10 with an acceptably small range of error.

The computation shown in FIG. 4 can be carried out by a programmed processor in the locator 22. Alternatively, the computation can also be carried out with operational amplifier units and other electronic circuit elements configured as arithmetic and comparator circuits.

The invention provides a simplified algorithm for determining whether a subsurface signal source has been located on a ghost signal. Use of a signal ratio and a simple comparison has the desirable virtues of speed and simplicity. Because the required antenna signal ratio is arbitrary, there is no need to insure equal channel gains for the horizontal and null antennas. The null signal is essentially zero over the proper location, making the ratio a very large number, and any gain error between the two signal components has negligible affect on the ratio computation. There is considerable design latitude associated with this invention. As noted above, the required ratio can be formed using either hardware or software as a matter of design convenience.

For example, as illustrated in FIG. 2, the ordinate X is defined as a horizontal distance ranging from −5 to 5 units of length away from the beacon in steps of 0.1, while the abscissa of Y direction sets the dipole source (beacon) one unit away. Thus, X corresponds to −5, −4.9 . . . 5 while Y corresponds to a distance of one unit.

There is defined a horizontal Bx(x) function and vertical By(x) function of magnetic field components. For the horizontal antenna 38, the function Bx(x) equals $(2X^2-Y^2)/(X^2+Y^2)^{5/2}$. For the null antenna 40, the function By(x) equals $3XY/(X^2+Y^2)^{5/2}$.

For a ghost check algorithm, if By(x) is greater than Bx(x) and on the local maximum of Bx(x), then the device is on a ghost and the location of the beacon has not been properly identified. If Bx(x) is greater than By(x) and on a local maximum of Bx(x), then it is not on the ghost and the beacon location has been properly identified.

Although the present invention has been described with respect to a specific preferred embodiment thereof, various changes and modifications may be suggested to one skilled in the art and it is intended that the present invention encompass such changes and modifications as fall within the scope of the appended claims.

We claim:
1. A method for locating the position of a movable subsurface beacon transmitting an electromagnetic dipole signal producing a true surface signal vertically positioned above the beacon and ghost surface signals laterally displaced from the vertical position, comprising the steps of:
orienting a first antenna of an above surface device substantially horizontal relative to the ground surface;
orienting a second antenna of the surface device substantially vertical to the ground surface;
calculating a ratio using signal strengths of a signal received from the subsurface beacon by the first antenna and by the second antenna
comparing the ratio to a predetermined number and identifying the received signal as a true signal if the ratio exceeds the predetermined number, and identifying the received signal as a ghost signal if the ratio is less than the predetermined number; and using the true surface signal to provide the true position of the beacon along the path of movement thereof.

2. The method of claim 1, wherein the device is a locator having a display, the method further comprising the step of:

indicating on said display whether the received signal is a ghost signal or is a true signal.

3. The method of claim 2, further comprising the step of calculating the depth of the transmitting beacon under the surface and displaying the depth on the display if the signal sensed is a true signal.

4. The method of claim 1, further comprising the step of switching reception of the received signal between the first antenna and the second antenna with a channel select switch.

5. The method of claim 1, further comprising the step of converting the signal strength received respectively by the first antenna and the second antenna into respective digital values using an analog-to-digital converter.

6. The method of claim 1, further comprising the step of calculating the ratio of the signal strengths received by the first antenna and the second antenna with a digital computation element.

7. Apparatus for locating the position of an underground movable beacon transmitting an electromagnetic dipole signal producing a true surface signal vertically positioned above the beacon, and a ghost surface signal laterally displaced from the vertical position, the apparatus above the ground surface comprising:

a first antenna, and a second antenna positioned substantially orthogonal to said first antenna;

a sensor to measure an electromagnetic field radiated from the underground beacon and induced as a signal in the first antenna when the first antenna is positioned substantially horizontal to the ground surface and to measure a signal induced in the second antenna from the electromagnetic field of the underground beacon when the second antenna is substantially vertical to the ground surface;

means for computing a ratio of the signal strengths measured from the first antenna and the second antenna and for comparing said ratio with a predetermined value;

a display;

means for indicating on said display a valid signal reception by the first and second antennas when the ratio exceeds a predetermined value; and means for indicating on said display reception of a ghost signal if the ratio is less than the predetermined value.

8. The apparatus of claim 7, further including means for multiplexing respective signals induced in the horizontal and vertical antennas to an analog-to-digital converter.

9. Apparatus for locating the position of an underground movable beacon transmitting an electromagnetic dipole signal producing a true signal and ghost signals as a function of a horizontal location of the apparatus with respect to the beacon, the apparatus above the ground surface comprising:

a first antenna and a second antenna, each being oriented orthogonal to each other, and each for receiving signals transmitted by the underground beacon;

a signal processing channel carrying the signals from the first and second antennas without substantially amplifying the signals differently;

an analog-to-digital converter for converting the signals received by each said antenna to corresponding digital signals;

a processor programmed to receive the digital signals and process said signals to form a ratio, and for comparing the ratio with a threshold value to determine if the received signals correspond to a ghost signal; and said processor programmed to provide a visual indication of a valid depth reading if a result of the comparison is determined not to be a ghost, and to provide a visual indication of an invalid depth reading if a result of the comparison is determined to be a ghost signal.

10. The apparatus of claim 9, wherein said signal processing channel comprises a switch for switching between each said first and second antenna and for coupling a switched signal to said analog-to-digital converter.

11. The apparatus of claim 9, wherein said processor is programmed to carry out the calculation:

$$BX(X)=(2X^2-Y^2)/(X^2+Y^2)^{5/2}$$

for one said antenna, and carry out the calculation $$BY(X)=3XY/(X^2+Y^2)^{5/2}$$

for the other said antenna, where

Bx(X) defines a horizontal component of a magnetic field transmitted by the beacon, and By(X) defines a vertical component of a magnetic field, and where X and Y are units of length.

12. A method of determining a location of an underground beacon transmitting a dipole pattern having a true surface signal positioned vertically above the beacon and a ghost surface signal laterally displaced from the vertical position, comprising the steps:

moving an antenna-equipped sensor laterally about the surface of the ground in the vicinity of the underground beacon to measure a magnetic field transmitted by the beacon;

periodically measuring a vertical magnetic field component and a horizontal magnetic field component of the dipole pattern transmitted by the beacon;

arithmetically processing pairs of horizontal and vertical components of the magnetic field measured to define a numerical value;

comparing the magnitude of the numerical valve with a predefined constant to determine if the numerical value is greater or less than the predefined constant;

providing by way of said sensor whether the result of the comparison identifies a true surface signal of the beacon and thus whether the sensor is positioned vertically above the underground beacon; and providing an indication of a ghost surface signal via the sensor if the comparison identified that a true surface signal has not been measured.

13. The method of claim 12 further including carrying out a calculation using the magnetic field components to determine a depth of the beacon transmitter below the surface only if the result of said comparison identifies a true surface signal, otherwise said depth calculation is not provided via the sensor.

14. The method of claim 12, further including processing the pairs of magnetic field components by calculating a ratio and comparing the ratio with said predefined constant.

15. The method of claim 12 further including processing the pairs of magnetic field components so as to provide a maximum numerical value when the true surface signal is measured directly above the underground beacon transmitter.

16. The method of claim 15, further including processing the pairs of magnetic field components so as to provide a maximum horizontal magnetic field component and a null vertical field component when the true surface signal is measured directly above the underground beacon transmitter.

17. The method of claim 12, further including measuring a magnetic field transmitted by a beacon transmitter fixed to a movable underground boring tool, whereby the beacon transmitter moves along a path of a bore being formed under the surface of the ground.

* * * * *